United States Patent [19]

Bandyopadhyay et al.

[11] Patent Number: 5,076,487
[45] Date of Patent: Dec. 31, 1991

[54] PROCESS FOR REFLOW SOLDERING

[75] Inventors: Nikhiles Bandyopadhyay, Somerset; Mark J. Kirschner, Morristown, both of N.J.

[73] Assignee: The BOC Group, Inc., Murray Hill, N.J.

[21] Appl. No.: 671,623

[22] Filed: Mar. 19, 1991

Related U.S. Application Data

[63] Continuation-in-part of Ser. No. 581,260, Sep. 11, 1990, abandoned, which is a continuation of Ser. No. 325,596, Mar. 20, 1989, abandoned.

[51] Int. Cl.$^5$ .................. B23K 1/005; B23K 31/02; B23K 35/363; B23K 35/38
[52] U.S. Cl. .................. 228/219; 228/220; 228/223; 228/248; 148/24
[58] Field of Search ............... 228/179, 207, 219, 220, 228/223, 248; 148/23, 24

[56] References Cited

U.S. PATENT DOCUMENTS 4,531,986  7/1985  Barajas .................. 148/24
4,610,391  9/1986  Nowotarski .................. 228/219
4,701,224  10/1987  Zado .................. 148/24

FOREIGN PATENT DOCUMENTS 2246827  4/1974  Fed. Rep. of Germany ........ 148/24
246718   6/1987  German Democratic Rep. .................. 228/219
293662  12/1986  Japan .................. 228/219

OTHER PUBLICATIONS

IBM Technical Disclosure Bulletin, "Joining Chip to Substrate in Oxygen-Containing Atmosphere", vol. 20, No. 6, p. 2318, 11-1977.
Multicore brochure-X32 Solder-Section 7/Apr. 1987.
Gessner G. Gawley, The Condensed Chemical Dictionary at 765 (8th Ed. 1966).
R. J. Klein Wassink, Soldering in Electronics at 261 (2nd Edition 1989).
Morris, J. R. & Bandyopadhyay, N., "No-Clean Solder Paste Reflow Processes", Printed Circuit Assembly, pp. 26-31, Feb. 1990.
IPC Standard IPC-SF-818—General Requirements for Electronic Standard Fluxes—Feb. 1988.
Federal Specification QQ-S-571E (May 5, 1972) for Solder; Tin Alloy, Tin-Lead Alloy, and Lead Alloy.

Primary Examiner—Samuel M. Heinrich
Attorney, Agent, or Firm—Carol A. Nemetz; Robert I. Pearlman

[57] ABSTRACT

A method of joining components to a substrate by reflow soldering with non-rosin-based flux containing solder is disclosed comprising heating the solder in the presence of the components in a low oxidizing atmosphere.

20 Claims, 1 Drawing Sheet

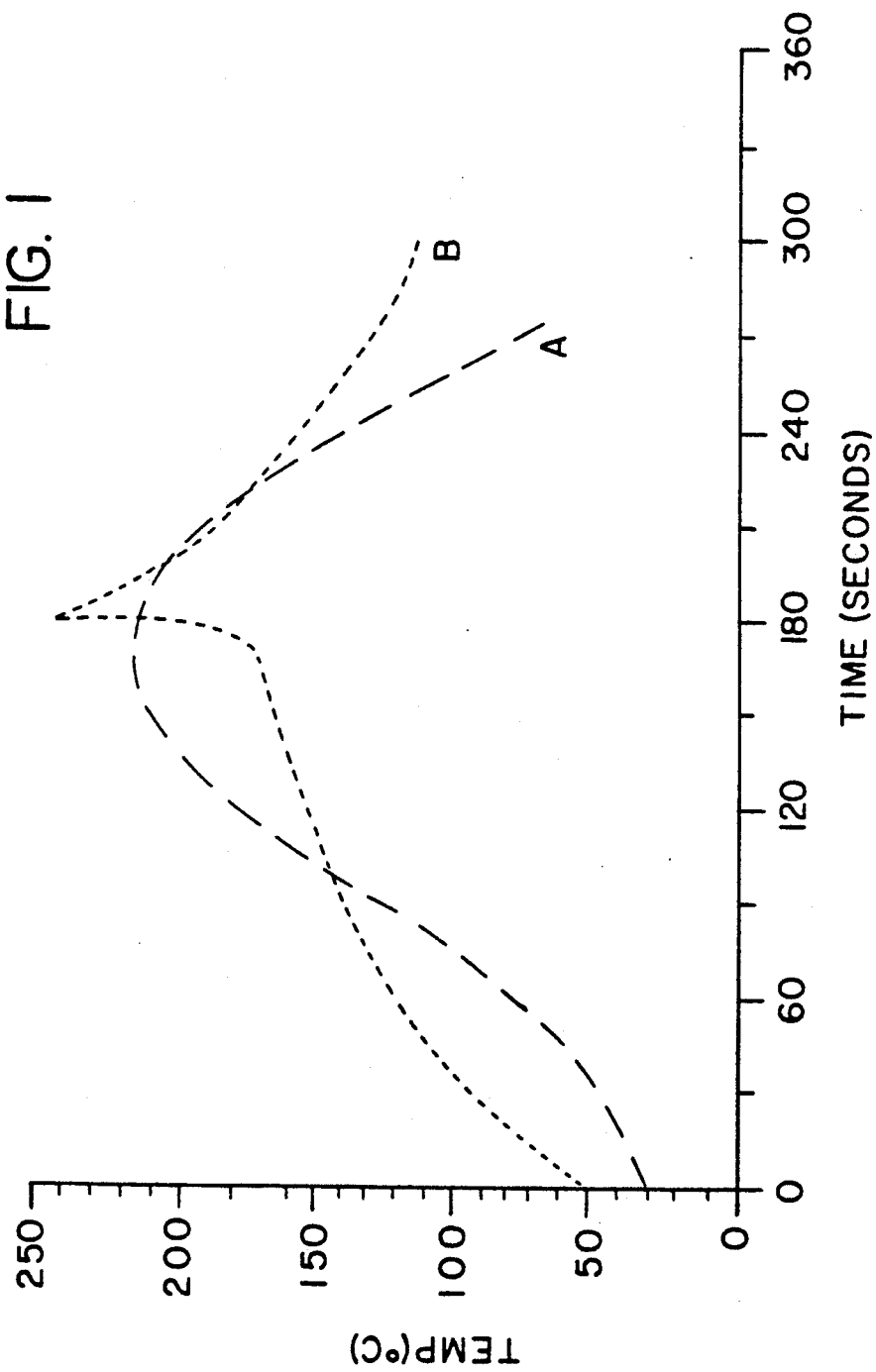

PROCESS FOR REFLOW SOLDERING

This is a continuation-in-part of application Ser. No. 07/581,260 filed Sep. 11, 1990, now abandoned, which is a continuation of application Ser. No. 07/325,596, filed Mar. 20, 1989, now abandoned.

FIELD OF THE INVENTION

The invention relates to process gas atmospheres for reflow soldering with non-rosin-based flux containing solder which yield substantially no organic or inorganic residues, good wetting of the substrate and of the components, relatively broad temperature operation windows and relatively short component exposure to higher temperatures. These advantages result in good solder joint integrity and reduced component failure.

BACKGROUND OF THE INVENTION

Reflow soldering is employed extensively in the surface mount industries and particularly in the automated manufacture of printed circuit boards. Generally, miniature electronic components are surface mounted on a printed circuit board to which a solder in a creamy or paste-like consistency has been applied by a method such as screen printing, stenciling or dispensing.

The printed circuit board is then subjected to a sufficiently high temperature, generally 50° C. greater than the melting point of the alloy, to cause the flux and the alloy in the solder to liquify and to contact the components so that upon subsequent cooling of the printed circuit board, the components are soldered in place on the board. The heat can be supplied by, for example, infrared, vapor phase, heated conveyor belt (hot belt) or convective means.

The solder is conventionally comprised of a soft powdered metal alloy dispersed in a liquid medium containing a flux, an organic solvent, and a thickening agent specially selected to impart the desired consistency to the mixture. Ideally, the flux component should be non-corrosive, thereby yielding flux residues after completion of soldering which are themselves non-corrosive and non-conducting. In practice, however, such is not the case. Rosin-based flux materials, such as abietic acid-based flux, are used in most commercially available solders specifically formulated for use in the surface mount industries. These fluxes commonly contain activators, such as halides, particularly bromides, which leave corrosive and conductive residues requiring expensive and time-consuming removal techniques. Conventionally, these removal techniques utilize organic solvents, e.g. fluorochlorocarbons which give rise to environmental problems. As an alternative, aqueous systems have been tried for residue removal. However, due to poor wetting, it is difficult to obtain the penetration necessary with such systems to achieve the required cleaning. Additionally, removal of flux residues is difficult, particularly from areas of printed circuit boards beneath the components soldered thereto.

Rosin-based fluxes have additional disadvantages whether or not they contain conventional activators. For example, corrosive, rosin-based flux residues tend to be sticky, thereby inhibiting the automatic testing of the circuits and proving aesthetically objectionable.

The use of rosin-based or mildly activated rosin-based flux-containing solders can also result in poor wetting by the solder of the substrate and of components to be soldered.

Flux residues tend to be hygroscopic, thereby causing spattering, and some fluxes also undermine solder joint integrity by mechanisms such as permitting alloy particles in the solder to migrate from the solder site, giving rise to the formation of numerous small discrete balls of soft solder around the soldered joint, in effect creating electrical short circuits.

Hedges, et al, U.K. Patent No. GB 2,198,676 have attempted to solve the flux residue problems with a solder formulated without the rosin-based flux whereby the liquid medium in which the powdered alloy is dispersed comprises a substantially water-immiscible organic solvent, such as terpineol, containing at least one organic acid other than a rosin or a modified rosin, an amine or an amine hydrohalide as a flux; and at least one thickening agent. This non-rosin-based flux containing formula is commercially available as Multicore ® X-32 from Multicore Solders, Hertfordshire, England.

However, the Hedges, et al solder still yields a discernable residue when reflowed in air even when the recommended temperature profile for heating is followed. It also wets poorly. This suggests that the operation window for reflow operations in air with the above solder is narrow and consequently difficult to practice commercially.

Oxidation on the surface of molten solder in lead tinning processes has been controlled by utilizing a nitrogen-purge system eliminating any contact of oxygen with the solder. See The Welding Journal, Vol. 65, No. 10, p 65 (1986). Lead tinning is performed on components prior to any soldering operations. Nitrogen has also been demonstrated to reduce white haze and to increase the chances of soldering marginally-solderable components. It is also suspected of reducing nonwetting, opens, solder balls, bridges and misalignments. See M. J. Mead and M. Nowotarski, The Effects of Nitrogen for IR Reflow Soldering, Technical Paper, SMT-IV-34, presented at the SMART IV Conference, Jan. 11-14, 1988.

The present invention surprisingly overcomes the above-mentioned problems and ensures good wetting of the substrate and of the components. In addition, the present invention leaves only a very mimimal post-solder residue and thereby eliminates post-solder cleaning operations. It is therefore an object of the invention to provide a method of reflow soldering which minimizes post-solder residue. It is a further object of the invention to provide a method of reflow soldering that can operate over a broad range of temperatures. It is yet a further object of the invention to provide a method of reflow soldering which ensures good wetting of the substrate and of the components. Another object of the invention is to provide a method of reflow soldering which exposes the components to maximum temperatures for a relatively short period of time.

SUMMARY OF THE INVENTION

According to the present invention, there is provided a method of joining at least one solderable component to a substate by heating a non-rosin-based flux containing solder in the presence of said component in a low oxidizing atmosphere.

A preferred feature of the invention is an atmosphere comprising no more than about 1500 parts per million of oxygen gas; no more than about 1.5 percent by volume of water vapor; and a primary gas selected from the group consisting of nitrogen, carbon dioxide, hydrogen, an inert gas or mixtures thereof; wherein if water vapor or oxygen is present, hydrogen is present in an amount effective to reduce the oxidation potential of the water vapor or oxygen, and wherein if neither oxygen or water vapor are present, then said primary gas is selected from the group consisting of nitrogen, carbon dioxide, hydrogen, or mixtures thereof.

Further contemplated by the present invention is a method of joining at least one component to a substrate comprising (i) applying a non-rosin-based flux containing solder to a substrate or to a component on said substrate, the non-rosin-based flux containing solder comprising finely divided soft solder alloy dispersed in a liquid medium, the liquid medium comprising a substantially water-immiscible organic solvent containing one or more organic acids other than rosin or modified rosin, an amine or amine hydrohalide salt as a flux; and one or more thickening agents; (ii) placing the substrate in a low oxidizing atmosphere comprising no more than about 1500 parts per million of oxygen; no more than about 1.5 percent by volume of water vapor; and a primary gas selected from the group consisting of nitrogen, carbon dioxide, hydrogen, an inert gas or mixtures thereof; wherein if water vapor or oxygen is present, hydrogen is present in an amount effective to reduce the oxidation potential of the water vapor or oxygen; and wherein if neither oxygen nor water vapor is present then said primary gas is selected from the group consisting of nitrogen, carbon dioxide, hydrogen or mixtures thereof; and (iii) heating the solder alloy in the non-rosin-based flux containing solder and fusing the solder joints of the components to form solder joints substantilly free of residue.

A method is also disclosed wherein step (ii) is performed before step (i).

BRIEF DESCRIPTION OF THE DRAWING

FIG. 1 is a graphic illustration of two heating profiles for reflow soldering with a preferred non-rosin-based flux containing solder in an atmosphere comprising air and in a low oxidizing atmosphere.

DETAILED DESCRIPTION OF THE INVENTION

The atmosphere of the present invention is a low oxidizing atmosphere. It preferably comprises no more than about 1500 parts per million of oxygen; no more than about 1.5 percent by volume of water vapor; and a primary selected from the group consisting of nitrogen, carbon dioxide, hydrogen, an inert gas or mixtures thereof; wherein if water vapor or oxygen is present, hydrogen will be present in an amount effective to reduce the oxidation potential of the water vapor or oxygen; and wherein if neither oxygen nor water vapor is present, then said primary gas is selected from the group consisting of nitrogen, carbon dioxide, hydrogen or mixtures thereof. Further preferred are atmospheres wherein water vapor comprises from about 0.5 percent by volume to about 1.5 percent by volume of the atmosphere.

Additionally, preferred are atmospheres wherein hydrogen comprises from about 2 to about 20 percent by volume of the total volume of the atmosphere, remembering that hydrogen is always present in an effective amount to reduce the oxidation potential of any water vapor or oxygen present in the atmosphere. The oxidation potential of each of water vapor and oxygen or the net oxidation potential of the two combined must be so low that little or no residue is formed during reflow soldering. This results in hydrogen generally being present in amounts by volume greater than the amount of water vapor, as hydrogen will reduce the oxidation potential of water. Oxygen is limited to merely trace amounts so that oxidation will not occur and will not thereby interfere with the soldering process. Hydrogen also reduces the oxidation potential of oxygen. Any of the inert gases are satisfactory in the present invention. However, if neither oxygen nor water vapor is present then the primary gas is nitrogen, carbon dioxide, hydrogen or mixtures thereof.

The most preferred atmosphere of the present invention comprises, by volume, about 1 percent of water vapor, about 15 percent of hydrogen and about 84 percent of nitrogen.

Non-rosin-based flux containing solders are distinguished from rosin-based or mildly activated rosin-based (RMA) flux containing solders typically used in the surface mount industries in that they do not contain significant amounts of rosinous acids in the flux, such as to fail the OOS-571E Copper mirror Corrosion Test commonly used to characterize solder paste vehicle systems, and do not contain significant amounts of halide-containing activators, such as to reduce the surface insulation resistance below the control value as described in the Bellcore Technical Reference TR-TSY-000078, Section 13.1 or IPC Standard IPC-SF-818.

The non-rosin-based flux containing solder of the present invention is typically a cream or a paste.

The organic acids useful in formulating the preferred non-rosin-based flux containing solder of the present invention include aliphatic carboxylic acids such as propionic acid, oxalic acid, adipic acid, malic acid, maleic acid and citric acid, as well as aromatic carboxylic acids such as salicylic acid. In a preferred embodiment, two or more aliphatic carboxylic acids, for example, malic acid and adipic acid, comprise the non-rosin-based flux. Other organic acids which may be used are sulfonic acids.

Amines and amine hydrohalides useful as the non-rosin-based flux include alkyl or cycloalkyl amines and aromatic amines, and the hydrohalide salts of such amines, for example, diethylamine, triethylamine, cyclohexylamine, N-methylanilide and the corresponding hydrohalide of the foregoing such as triethylamine hydrobromide.

Substantially water-immiscible organic solvents useful in the present invention include monohydric compounds such as terpineol, and esters such as 2-ethoxyethyl acetate. Such solvents will have a relatively low melting point, a boiling point below the soldering temperature and low moisture absorption. These solvents may optionally be blended with polyhydric compounds such as glycols, for example, diethylene glycol, dipropylene glycol, or hexylene glycol; or hydric ethers, for example, triethylene glycol monethyl ether or tetraethylene glycol dimethyl ether, provided that the blend has a relatively low melting point, a boiling point below the soldering temperature, and low moisture absorption.

The thickening agent may be any of those conventionally employed in the art of the preparation of solder creams such as, for example, ethylcellulose or hydrogenated castor oil. In a preferred embodiment, two or more thickening agents are present in the non-rosin-based flux containing solder cream, for example, ethylcellulose and hydrogenated castor oil.

The volatile amine which is preferably present in the liquid medium may be, for example, morpholine or tributylamine. A chelating agent may also optionally be present, for example, benzotriazole or imidazole which is capable of reducing any discoloration created by solder reaction products.

Preferably, the liquid medium of the solder cream contains, on a percent by weight basis, from 0.2 to 10 percent, preferably from 0.5 to 5 percent of organic flux; from 0.1 to 10 percent, preferably from 0.5 to 5 percent of thickening agent(s); from 0 to about 10 percent, preferably from 0 to about 3 percent of organic amine; and from 0 to about 1 percent, preferably 0 to 1 percent, preferably from 0 to about 0.5 percent by weight of chelating agent.

The powdered soft solder alloy used in the non-rosin-based flux containing solder may comprise on a weight basis, particles of, for example, tin:lead alloy, tin:lead:antimony alloy, tin:lead:silver alloy, or tin:lead:silver:antimony alloy. Such alloys comprise on a weight basis, for example, 60 percent tin:40 percent lead, 63 percent tin:37 percent lead, 63 percent tin:36.7 percent lead:0.3 percent antimony, 63 percent tin:35 percent lead:2 percent silver, 62 percent tin:36 percent lead:2 percent silver or 62 percent tin:35.7 percent lead:2 percent silver:0.3 percent antimony. The solder alloy powder preferably has a particle size in the range of from 10 to 150 microns and most preferably from 20 to 100 microns.

The non-rosin-based flux containing solder may be prepared by admixing the powdered soft alloy with the liquid medium in a conventional manner. Preferably, the solder comprises from 70 to 95 percent by weight of alloy and correspondingly from 5 to 30 percent by weight of liquid medium and most preferably from 75 to 90 percent by weight of alloy and correspondingly from 10 to 25 percent by weight of liquid medium based upon 100 percent by weight of alloy and liquid medium combined.

The powdered soft solder alloy can be prepared in an atmosphere of only nitrogen or an inert gas in order to substantially eliminate oxidation of the alloy particles to produce a solder substantially free of oxides, i.e. less than 0.1 percent by weight based upon the total weight of the alloy.

The heating step of the present invention can be conducted by infrared, convective, vapor or heated conveyor belt (hot belt) means. The chamber or vessel in which the operation may take place may comprise a furnace or the like.

FIG. 1 heat profile A is the typical heat profile used in conventional reflow soldering. The substrate, the solder and the components are subjected to the maximum temperature for a relatively prolonged time as illustrated by the plateau in the middle of the heat cycle. Although such a heat profile may be used with the present invention, preferred heat profiles are of the type illustrated in FIG. 1, heat profile B wherein the maximum heat is reached during a relatively short period illustrated as a spike. Consequently, the substrate, the solder and the components are subjected to maximum heat for a shorter period of time than in the conventional heat profile, and component failures are reduced.

Suitable substrates include without limitation printed circuit boards, hybrid circuits, clean metals such as copper and the like, and mildly oxidized metals such as mildly oxidized copper and the like.

DESCRIPTION OF THE PREFERRED EMBODIMENTS

The following examples illustrate the invention without limitation.

EXAMPLES 1-3

A non-rosin-based flux containing solder paste, alloy composition 62 wt. percent Sn:36 wt. percent Pb:2 wt. percent Ag (Multicore ® X-32,), is applied to the surface of a mildly oxidized copper coupon substrate, to a printed circuit board substrate, and to a hybrid circuit substrate. The substrates are placed in a chamber containing an atmosphere of 1 percent by volume of water vapor, 15 percent by volume of hydrogen gas and 84 percent by volume of nitrogen gas and then are heated by infrared means according to a heat profile of a preheat setting of 175° C. for 200 seconds and a peak temperature of 260° C. for 5 seconds. The solder reflows, the texture is unremarkable, and there is no visible residue.

EXAMPLES 4-6

A non-rosin-based flux containing solder paste, alloy composition 62 wt. percent Sn:36 wt. percent Pb:2 wt. percent Ag (Multicore ® X-32), is applied to the surface of a clean copper coupon substrate, a printed circuit board substrate, and a hbrid circuit substrate. The substrates are placed in a chamber containing an atmosphere of 0.55 percent by volume of water vapor, 5 percent by volume of hydrogen gas, and 94.45 percent by volume of nitrogen gas and then are heated by infrared means according to a heat profile of a preheat setting of 175° C. for 200 seconds and a peak temperature of 260° C. for 5 seconds. The solder reflows, the texture is rough, and there is no visible residue.

EXAMPLE 7

The procedure of Example 4 is followed substituting a mildly oxidized copper coupon substrate for the substrate and an atmosphere of 0.60 percent by volume of water vapor, 5 percent by volume of hydrogen gas and 94.4 percent by volume of nitrogen gas for the atmosphere. The solder reflows, the texture is rough, and there is no visible residue.

EXAMPLES 8-9

The procedure of Example 7 is followed substituting a printed circuit board substrate and a hybrid circuit substrate for the substrate. The solder reflows well, the texture is rough, and there is no visible residue.

COMPARATIVE EXAMPLES 10-12

The procedures of Examples 1-3 are followed substituting an atmosphere of 1 percent by volume of water vapor, 2 percent by volume of hydrogen gas and 97 percent by volume of nitrogen gas for the atmosphere. The solder reflows, and there is a residue.

EXAMPLES 13-15

The procedures of Examples 7-9 are followed substituting an atmosphere of 15 percent by volume of hydrogen gas and 85 percent by volume of nitrogen gas for the atmosphere. The solder reflows well, and there is a minimal amount of residue.

EXAMPLE 16

The procedure of Examples 4 is followed substituting an atmosphere of nitrogen gas for the atmosphere. The solder reflows well, and there is some visible organic residue. There is adequate wetting of the substrate.

EXAMPLES 17-18

The procedures of Examples 5 and 6 are followed substituting an atmosphere of nitrogen gas for the atmosphere. The solder reflows well, and there is some visible residue.

EXAMPLE 19

The procedure of Example 16 is followed substituting a mildly oxidized copper coupon substrate for the substrate. The solder reflows well, and there is little organic residue.

EXAMPLE 20

A non-rosin-based flux containing solder, alloy composition 62 wt. percent Sn:36 wt. percent Pb:2 wt. percent Ag (Multicore ® X-32), is applied to the surface of a mildly oxidized copper coupon substrate. The substrate is placed in an atmosphere of carbon dioxide gas and then is heated by infrared means according to a heat profile of a preheat setting of 200° C. for 180 seconds and a peak temperature of 260° C. for 5 seconds. There is adequate wetting of the substrate.

COMPARATIVE EXAMPLES 21-23

An non-rosin-based flux containing solder paste, alloy composition 62 wt. percent Sn:36 wt. percent Pb:2 wt. percent Ag (Multicore ® X-32), is applied to the surface of a clean copper coupon substrate, to a printed circuit board substrate and to a hybrid circuit substrate. The substrates are placed in an atmosphere of 100 percent helium at a total flow of 2 cu.ft./hr. and then are heated by infrared means according to a heat profile of a preheat setting of 175° C. for 200 seconds, and a peak temperature of 260° C. for 6 seconds. The solder does not melt.

COMPARATIVE EXAMPLES 24-26

The procedures of Comparative Examples 21-23 are followed substituting a heat profile of a preheat setting of 175° C. for 200 seconds and a peak temperature of 260° C. for 7 seconds. The solder does not melt.

COMPARATIVE EXAMPLES 27-29

The procedures of Examples 4-6 are followed substituting an atmosphere of air for the atmosphere. atmosphere. The solder melts but reflows only partially, and there is solder ball formation.

COMPARATIVE EXAMPLE 30

The procedure of Comparative Example 27 is followed substituting a mildly oxidized copper coupon substrate for the substrate. The solder melts but reflows only partially. The solder does not wet the copper coupon substrate, and there is solder ball formation.

All patents, applications and publications mentioned above are hereby incorporated by reference.

Many variations of the present invention will suggest themselves to those skilled in this art in light of the above, detailed description. For example, other alloys may be used to formulate the solder and other means may be used to supply heat. All such obvious variations are within the full scope of the appended claims.

We claim:

1. A method of joining at least one solderable component to a substrate comprising heating a non-rosin-based flux containing solder in the presence of said component in a low oxidizing atmosphere, wherein said low oxidizing atmosphere comprises a mixture of oxygen and water vapor, comprising no more than about 1500 parts per million oxygen and no more than about 1.5 percent by volume water vapor; and a primary gas selected from the group consisting of nitrogen, carbon dioxide, hydrogen, and inert gas or mixtures thereof; wherein hydrogen is present in an amount effective to reduce the oxidation potential of the water vapor and oxygen.

2. The method of claim 1 wherein said primary gas is nitrogen.

3. The method of claim 1 wherein said non-rosin-based flux containing solder comprises finely divided soft solder alloy dispersed in a liquid medium which comprises a substantially water-immiscible organic solvent containing one or more organic acids other than rosin or modified rosin, amines or amine hydrohalide salts as a flux; and at least one thickening agent.

4. The method of claim 3 wherein said non-rosin-based flux containing solder further comprises a volatile amine capable of reacting with any excess acids remaining during a soldering operation in which the solder is used, a chelating agent capable of reducing any discoloration created by the solder reaction products, or a combination thereof.

5. The method of claim 3 wherein said substantially water-immiscible organic solvent is selected from the group consisting of a monohydric compound, a monohydric compound blended with a polyhydric compound or a mixture thereof.

6. The method of claim 3 wherein said alloy is selected from the group consisting of tin:lead alloy, tin:lead:antimony alloy, tin:lead:silver alloy and tin:lead:silver:antimony alloy.

7. The method of claim 1 wherein said low oxidizing atmosphere is contained in an infrared reflow furnace.

8. The method of claim 1 wherein said low oxidizing atmosphere is contained in a convection reflow furnace.

9. A method of joining at least one solderable component to a substrate comprising heating a non-rosin-based flux containing solder in the presence of said component in a low oxidizing atmosphere, wherein said low oxidizing atmosphere comprises no more than about 1500 parts per million of oxygen and no more than about 1.5 percent by volume of water vapor; and a primary gas selected from the group consisting of nitrogen, carbon dioxide, hydrogen, an inert gas or mixtures thereof; wherein hydrogen is present in an amount effective to reduce the oxidation potential of the water vapor and oxygen; wherein said low oxidizing atmosphere comprises from about 0.5 to about 1.5 percent by volume of water vapor and from about 2 to about 20 percent by volume of hydrogen.

10. A method of joining at least one solderable component to a substrate comprising heating a non-rosin-based flux containing solder in the presence of said component in a low oxidizing atmosphere, wherein said low oxidizing atmosphere comprises no more than about 1500 parts per million of oxygen and no more than about 1.5 percent by volume of water vapor; wherein hydrogen is present in an amount effective to reduce the oxidation potential of the water vapor and oxygen; and a primary gas which is nitrogen; wherein said low oxidizing atmosphere comprises about 1 percent by volume of water vapor, about 15 percent by volume of hydrogen gas and about 84 percent of nitrogen.

11. A method of joining at least one solderable component to a substrate comprising heating a non-rosin-based flux containing solder in the presence of said component in a low oxidizing atmosphere, wherein said low oxidizing atmosphere comprises a mixture of oxygen and water vapor, comprising no more than about 1500 parts per million oxygen and no more than about 1.5 percent by volume water vapor; and a primary gas selected from the group consisting of nitrogen, carbon dioxide, hydrogen, an inert gas or mixtures thereof; wherein hydrogen is present in an amount effective to reduce the oxidation potential of the water vapor and oxygen,
wherein if neither oxygen nor water vapor is present then said primary gas is selected from the group consisting of hydrogen, carbon dioxide, mixtures thereof, and nitrogen in combination with hydrogen or carbon dioxide or a mixture thereof.

12. A method of joining at least one component to a substrate comprising:
(i) applying a non-rosin-based flux containing solder to said substrate or to said component on said substrate, said non-rosin-based flux containing solder comprising a finely divided soft solder alloy dispersed in a liquid medium comprising a substantially water-immersible organic solvent containing one or more organic acids other than rosin or modified rosin, amines, or amine hydrohalide salt as a flux; and one or more thickening agents;
(ii) placing said substrate in a low oxidizing atmosphere comprising a mixture of oxygen and water vapor, comprising no more than about 1500 parts per million of oxygen and no more than about 1.5 percent by volume of water vapor; and a primary gas selected from the group consisting of nitrogen, carbon dioxide, hydrogen, an inert gas or mixtures thereof; wherein hydrogen is present in an amount effective to reduce the oxidation potential of the water vapor and oxygen; and
(iii) heating said substrate to a temperature sufficient to form solder joints substantially free of residue.

13. A method as defined in claim 12 wherein step (ii) is performed before step (i).

14. The method of claim 12 wherein said primary gas is nitrogen.

15. The method of claim 12 wherein said low oxidizing atmosphere is contained in an infrared reflow furnace.

16. The method of claim 12 wherein said low oxidizing atmosphere is contained in a convection reflow furnace.

17. A method of joining at least one component to a substrate comprising:
(i) applying a non-rosin-based flux containing solder to said substrate or to said component on said substrate, said non-rosin-based flux containing solder comprising a finely divided soft solder alloy dispersed in a liquid medium comprising a substantially water-immersible organic solvent containing one or more ortanic acids other than rosin or modified rosin, amines, or amine hydrohalide salt as a flux; and one or more thickening agents;
(ii) placing said substrate in a low oxidizing atmosphere comprising no more than about 1500 parts per million of oxygen and no more than about 1.5 percent by volume of water vapor; and a primary gas selected from the group consisting of nitrogen, carbon dioxide, hydrogen, an inert gas or mixtures thereof; wherein hydrogen is present in an amount effective to reduce the oxidation potential of the water vapor and oxygen; and
(iii) heating said substrate to a temperature sufficient to form solder joints substantially free of residue
wherein said low oxidizing atmosphere comprises from about 0.5 to about 1.5 percent by volume of water vapor and from about 2 to about 20 percent by volume of hydrogen.

18. A method of joining at least one component to a substrate comprising:
(i) applying a non-rosin-based flux containing solder to said substrate or to said component on said substrate, said non-rosin-based flux containing solder comprising a finely divided soft solder alloy dispersed in a liquid medium comprising a substantially water-immersible organic solvent containing one or more organic acids other than rosin or modified rosin, amines, or amine hydrohalide salt as a flux; and one or more thickening agents;
(ii) placing said substrate in a low oxidizing atmosphere comprising no more than about 1500 parts per million of oxygen and no more than about 1.5 percent by volume of water vapor; and a primary gas selected from the group consisting of nitrogen, carbon dioxide, hydrogen, an inert gas or mixtures thereof; wherein hydrogen is present in an amount effective to reduce the oxidation potential of the water vapor and oxygen; and
(iii) heating said substrate to a temperature sufficient to form solder joints substantially free of residue
wherein said low oxidizing atmosphere comprises about 1 percent by volume of water vapor, about 15 percent by volume of hydrogen and about 84 percent by volume of nitrogen.

19. A method of joining at least one component to a substrate comprising:
(i) applying a non-rosin-based flux containing solder to said substrate or to said component on said substrate, said non-rosin-based flux containing solder comprising a finely divided soft solder alloy dispersed in a liquid medium comprising a substantially water-immersible organic solvent containing one or more organic acids other than rosin or modified rosin, amines, or amine hydrohalide salt as a flux; and one or more thickening agents;
(ii) placing said substrate in a low oxidizing atmosphere comprising no more than about 1500 parts per million of oxygen and no more than about 1.5 percent by volume of water vapor; and a primary gas selected from the group consisting of nitrogen, carbon dioxide, hydrogen, an inert gas or mixtures thereof; wherein hydrogen is present in an amount effective to reduce the oxidation potential of the water vapor and oxygen; and
(iii) heating said substrate to a temperature sufficient to form solder joints substantially free of residue
wherein said solder alloy comprises a lead:tin:silver alloy; said low oxidizing atmosphere comprises about 1 percent by volume of water vapor, about 15 percent by volume of hydrogen and about 84 percent by volume of nitrogen; said low oxidizing atmosphere is contained in an infrared reflow furnace; and said heating is performed in accordance with an appropriate heating profile.

20. A method of joining at least one component to a substrate comprising:
(i) applying a non-rosin-based flux containing solder to said substrate or to said component on said substrate, said non-rosin-based flux containing solder comprising a finely divided soft solder alloy dispersed in a liquid medium comprising a substantially water-immersible organic solvent containing one or more organic acids other than rosin or modified rosin, amines, or amine hydrohalide salt as a flux; and one or more thickening agents;
(ii) placing said substrate in a low oxidizing atmosphere comprising a mixture of oxygen and water vapor, comprising no more than about 1500 parts per million of oxygen; no more than about 1.5 percent by volume of water vapor; and a primary gas selected from the group consisting of nitrogen, carbon dioxide, hydrogen, an inert gas or mixtures thereof; wherein hydrogen is present in an amount effective to reduce the oxidation potential of the water vapor and oxygen;
wherein if neither oxygen nor water vapor is present then said primary gas is selected from the group consisting of hydrogen, carbon dioxide, mixtures thereof, and nitrogen in combination with hydrogen or carbon dioxide or a mixture thereof; and
(iii) heating said substrate to a temperature sufficient to form solder joints substantially free of residue.

* * * * *